US 8,424,877 B2

(12) United States Patent
Dinu et al.

(10) Patent No.: US 8,424,877 B2
(45) Date of Patent: Apr. 23, 2013

(54) METHOD AND SYSTEM FOR SEALING AN ANNULUS

(75) Inventors: Constantin Dinu, Katy, TX (US); James Michael Storey, Houston, TX (US); Aaron John Avagliano, Houston, TX (US); Douglas S. Byrd, Greer, SC (US); Shaoping Shi, Houston, TX (US); Judeth Brannon Corry, Manvel, TX (US); Allyson Joy Jimenez Huyke, Houston, TX (US)

(73) Assignee: General Electric Company, Schenectady, NY (US)

( * ) Notice: Subject to any disclaimer, the term of this patent is extended or adjusted under 35 U.S.C. 154(b) by 952 days.

(21) Appl. No.: 12/464,579

(22) Filed: May 12, 2009

(65) Prior Publication Data

US 2010/0288474 A1 Nov. 18, 2010

(51) Int. Cl.
*F16J 15/447* (2006.01)
(52) U.S. Cl.
USPC ........... 277/412; 277/417; 277/418; 277/419; 277/420; 277/421
(58) Field of Classification Search .................. 277/412, 277/417, 418, 419, 420, 421
See application file for complete search history.

(56) References Cited

U.S. PATENT DOCUMENTS

| | | | | |
|---|---|---|---|---|
| 3,572,728 A | * | 3/1971 | Smuland | 277/419 |
| 3,630,529 A | * | 12/1971 | Ball | 277/419 |
| 4,463,956 A | * | 8/1984 | Malott | 277/412 |
| 5,639,095 A | * | 6/1997 | Rhode | 277/303 |
| 2002/0109303 A1 | * | 8/2002 | Fried | 277/415 |
| 2003/0067119 A1 | * | 4/2003 | Burkhard et al. | 277/412 |
| 2007/0119577 A1 | | 5/2007 | Kraft et al. | |
| 2007/0296159 A1 | * | 12/2007 | Feeny | 277/413 |
| 2008/0041322 A1 | | 2/2008 | Fry et al. | |
| 2008/0041572 A1 | | 2/2008 | Wessel et al. | |
| 2008/0042373 A1 | | 2/2008 | Wilson et al. | |
| 2009/0047193 A1 | | 2/2009 | Corry et al. | |
| 2012/0091662 A1 | * | 4/2012 | Neeli et al. | 277/420 |

OTHER PUBLICATIONS

U.S. Appl. No. 12/030,698, filed Feb. 13, 2008, to Jimenez-Huyke et al.

* cited by examiner

*Primary Examiner* — Brandon M Rosati
(74) *Attorney, Agent, or Firm* — Armstrong Teasdale LLP (57) ABSTRACT

A method and systems for a purged seal for an annular space are provided. The purged seal includes a first baffle element that extends from an inner surface of the annular space into the annular space at an oblique angle and a second baffle element that extends from an outer surface of the annular space above the first baffle element in a direction opposite gravity flow into the annular space wherein the second baffle element extends at an oblique angle. The system also includes a third baffle element that extends from the inner surface above the first baffle element in a direction of gravity flow into the annular space wherein the third baffle element extends into the annular space at an oblique angle with respect to the inner surface and wherein a distal end of the third baffle element is positioned proximate a distal end of the second baffle element.

10 Claims, 9 Drawing Sheets

METHOD AND SYSTEM FOR SEALING AN ANNULUS

BACKGROUND OF THE INVENTION

The field of the invention relates generally to annular vessels, and more specifically, to a method and systems for sealing annular spaces inside a radiant syngas cooler.

In quench gasifiers, syngas is passed through a water bath where it is cooled down to a temperature which can be handled by the downstream systems. The quench water also retains some of the solids carried by syngas and assists in solidification of the slag which is transferred to the slag crusher. After passing through the quench water syngas flows from the Radiant Syngas Cooler (RSC) through a syngas transfer line. An annulus exists between the heat transfer surfaces (tube cage) which confine the hot gas path and the outer shell (vessel) of the RSC. This annular space is continuously purged with nitrogen to prevent syngas accumulation in this area, which could result in significant corrosion.

During unsteady events, syngas can migrate into the annulus between the tube cage and the vessel. Such a condition could result in damage to the tube cage due to dew point corrosion ($H_2S$ and HCl which can exist in syngas are very corrosive and tend to condensate at a temperature of approximately 450° Fahrenheit to approximately 600° Fahrenheit (230-320° Celsius). During severe upsets of the flow through the RSC, for example, during light off, syngas and water could reach the annular space. Water greatly increases the risk of corrosion of the annular space. To mitigate these risks and eliminate other hazards, the RSC annulus is continuously purged with a purge fluid such as nitrogen. Nitrogen is discharged at the top of the annulus, flows through the annular space between the tube cage and the vessel and mixes with syngas to dilute the corrosive components of the syngas. The purge fluid then mixes with the syngas as it flows through the syngas transfer line. Purge flow is initiated before light off to assure that oxygen (air) is removed before syngas production starts. Many versions of seals have failed to provide adequate protection to the annular space and adequate thermal expansion margin.

BRIEF DESCRIPTION OF THE INVENTION

In one embodiment, a purged seal system for an annular space is provided. The annular space includes an inner surface of a radially outer vessel, an outer surface of a radially inner vessel, and a seal passage therebetween, the annular space is divided into an upper annular space and a lower annular space by the purged seal. The purged seal system includes a first baffle element that extends from the inner surface into the seal passage at an oblique angle with respect to the inner surface and a second baffle element that extends from the outer surface above the first baffle element in the direction of the purge flow into the seal passage, the second baffle element extending at an oblique angle with respect to the outer surface. The purged seal system also includes a third baffle element that extends from the inner surface above the first baffle element in the direction of the purge flow into the seal passage, the third baffle element extending at an oblique angle with respect to the inner surface, an end of the third baffle element is positioned in close proximity to the end of the second baffle element.

In another embodiment, a method of sealing an annular space includes forming a first gap using a first baffle element that extends obliquely into the annular space and forming a second gap using a second baffle element that extends obliquely into the annular space such that the first and second gaps are offset across the annular space.

In yet another embodiment, a radiant syngas cooler system includes a radially outer vessel wherein the vessel is approximately cylindrically shaped and having a longitudinal axis. The radiant syngas cooler system includes a tube cage surrounded by the vessel wherein the tube cage and the vessel define an annulus therebetween. The radiant syngas cooler system further includes a purged annular seal circumscribing the tube cage in the annulus. The purged annular seal separates the annulus into an upper annular space and a lower annular space wherein the purged annular seal includes a first passage formed by a first baffle element that extends into the annulus at an oblique angle and a second passage formed by at least a second baffle element that extends into the annulus at an oblique angle, the at least a second baffle element is displaced axially from the first baffle element in a direction of gravity flow and the first and the at least a second baffle elements define a seal volume therebetween.

DETAILED DESCRIPTION OF THE INVENTION

The following detailed description illustrates embodiments of the invention by way of example and not by way of limitation. It is contemplated that the invention has general application to sealing annular spaces in other industrial or commercial applications.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Figure 1:
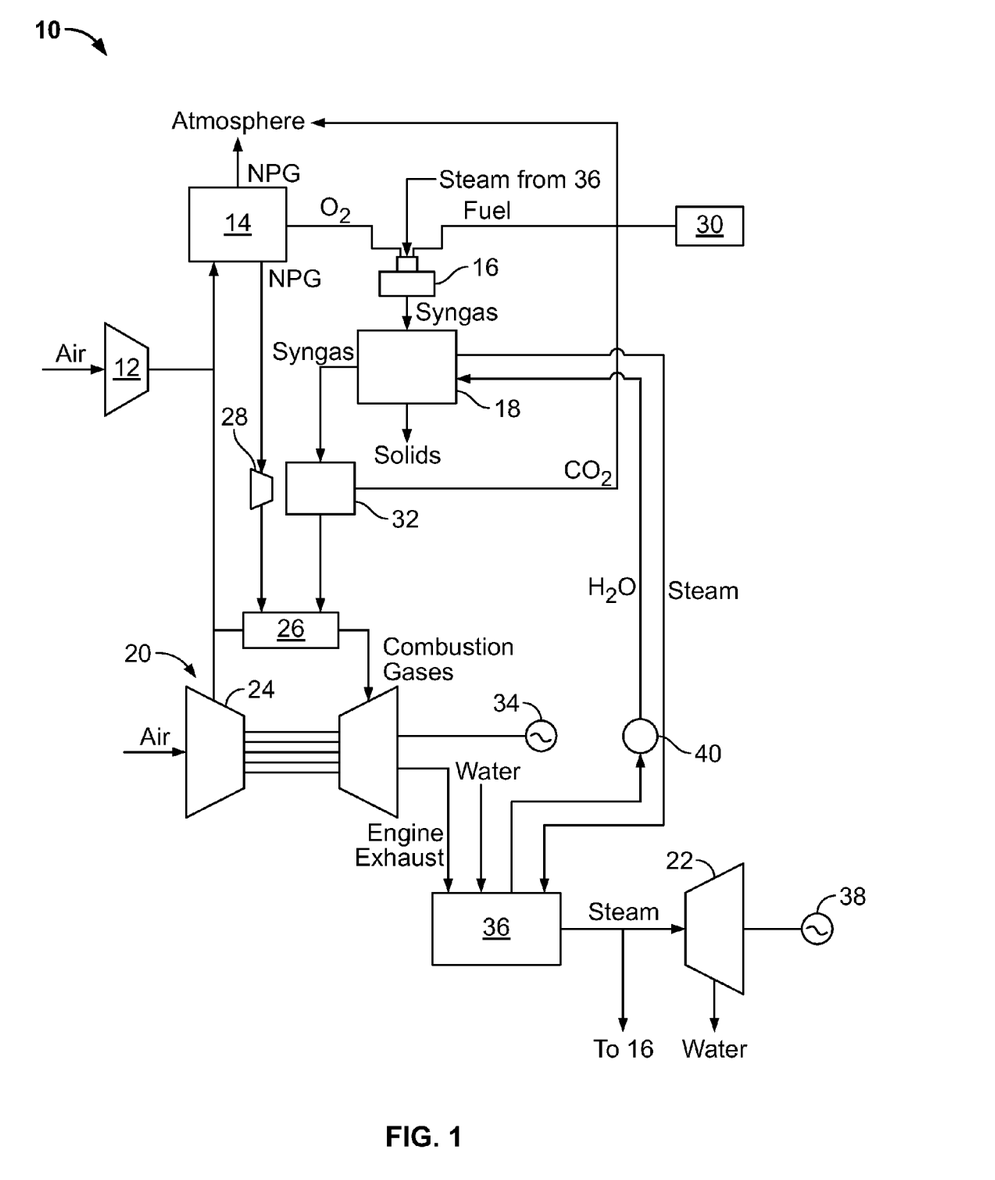
FIG. 1 is a schematic diagram of an exemplary integrated gasification combined-cycle (IGCC) power generation system in accordance with an exemplary embodiment of the present invention.

FIG. 1 is a schematic diagram of an exemplary integrated gasification combined-cycle (IGCC) power generation system 10. IGCC system 10 generally includes a main air compressor 12, an air separation unit (ASU) 14 coupled in flow communication to compressor 12, a gasifier 16 coupled in flow communication to ASU 14, a syngas cooler 18 coupled in flow communication to gasifier 16, a gas turbine engine 20 coupled in flow communication with syngas cooler 18, and a steam turbine engine 22 coupled in flow communication with syngas cooler 18.

In operation, compressor 12 compresses ambient air that is then channeled to ASU 14. In the exemplary embodiment, in addition to compressed air from compressor 12, compressed air from a gas turbine engine compressor 24 is supplied to ASU 14. Alternatively, compressed air from gas turbine engine compressor 24 is supplied to ASU 14, rather than compressed air from compressor 12 being supplied to ASU 14. In the exemplary embodiment, ASU 14 uses the compressed air to generate oxygen for use by gasifier 16. More specifically, ASU 14 separates the compressed air into separate flows of oxygen ($O_2$) and a gas by-product, sometimes referred to as a "process gas". The $O_2$ flow is channeled to gasifier 16 for use in generating synthesis gases, referred to herein as "syngas" for use by gas turbine engine 20 as fuel, as described below in more detail.

The process gas generated by ASU 14 includes nitrogen and will be referred to herein as "nitrogen process gas" (NPG). The NPG may also include other gases such as, but not limited to, oxygen and/or argon. For example, in the exemplary embodiment, the NPG includes between about 95% and about 100% nitrogen. In the exemplary embodiment, at least some of the NPG flow is vented to the atmosphere from ASU 14, and at least some of the NPG flow is injected into a combustion zone (not shown) within a gas turbine engine combustor 26 to facilitate controlling emissions of gas turbine engine 20, and more specifically to facilitate reducing the combustion temperature and reducing nitrous oxide emissions from gas turbine engine 20. In the exemplary embodiment, IGCC system 10 includes a NPG compressor 28 for compressing the nitrogen process gas flow before being injected into a combustion zone (not shown) of gas turbine engine combustor 26.

In the exemplary embodiment, gasifier 16 converts a mixture of fuel supplied from a fuel supply 30, $O_2$ supplied by ASU 14, steam, and/or liquid water, and/or slag additive into an output of syngas for use by gas turbine engine 20 as fuel. Although gasifier 16 may use any fuel, gasifier 16, in the exemplary embodiment, uses coal, petroleum coke, residual oil, oil emulsions, tar sands, and/or other similar fuels. Furthermore, in the exemplary embodiment, syngas generated by gasifier 16 includes carbon monoxide, hydrogen, and carbon dioxide. In the exemplary embodiment, gasifier 16 is an entrained flow gasifier, configured to discharge syngas, slag, and fly ash vertically downward into syngas cooler 18. Alternatively, gasifier 16 may be any type and configuration that facilitates operation of syngas cooler 18 as described herein.

In the exemplary embodiment, syngas generated by gasifier 16 is channeled to syngas cooler 18 to facilitate cooling the syngas, as described in more detail below. The cooled syngas is channeled from syngas cooler 18 to a clean-up device 32 that facilitates cleaning the syngas before it is channeled to gas turbine engine combustor 26 for combustion therein. Carbon dioxide ($CO_2$) may be separated from the syngas during clean-up and, in the exemplary embodiment, may be vented to the atmosphere. Gas turbine engine 20 drives a first generator 34 that supplies electrical power to a power grid (not shown). Exhaust gases from gas turbine engine 20 are channeled to a heat recovery steam generator (HRSG) 36 that generates steam for driving steam turbine engine 22. Power generated by steam turbine engine 22 drives a second generator 38 that also provides electrical power to the power grid. In the exemplary embodiment, steam from heat recovery steam generator 36 may be supplied to gasifier 16 for generating syngas.

Furthermore, in the exemplary embodiment, system 10 includes a pump 40 that supplies heated water from HRSG 36 to syngas cooler 18 to facilitate cooling syngas channeled from gasifier 16. The heated water is channeled through syngas cooler 18 wherein water is converted to steam. Steam from syngas cooler 18 is then returned to HRSG 36 for use within gasifier 16, syngas cooler 18, and/or steam turbine engine 22.

Figure 2:
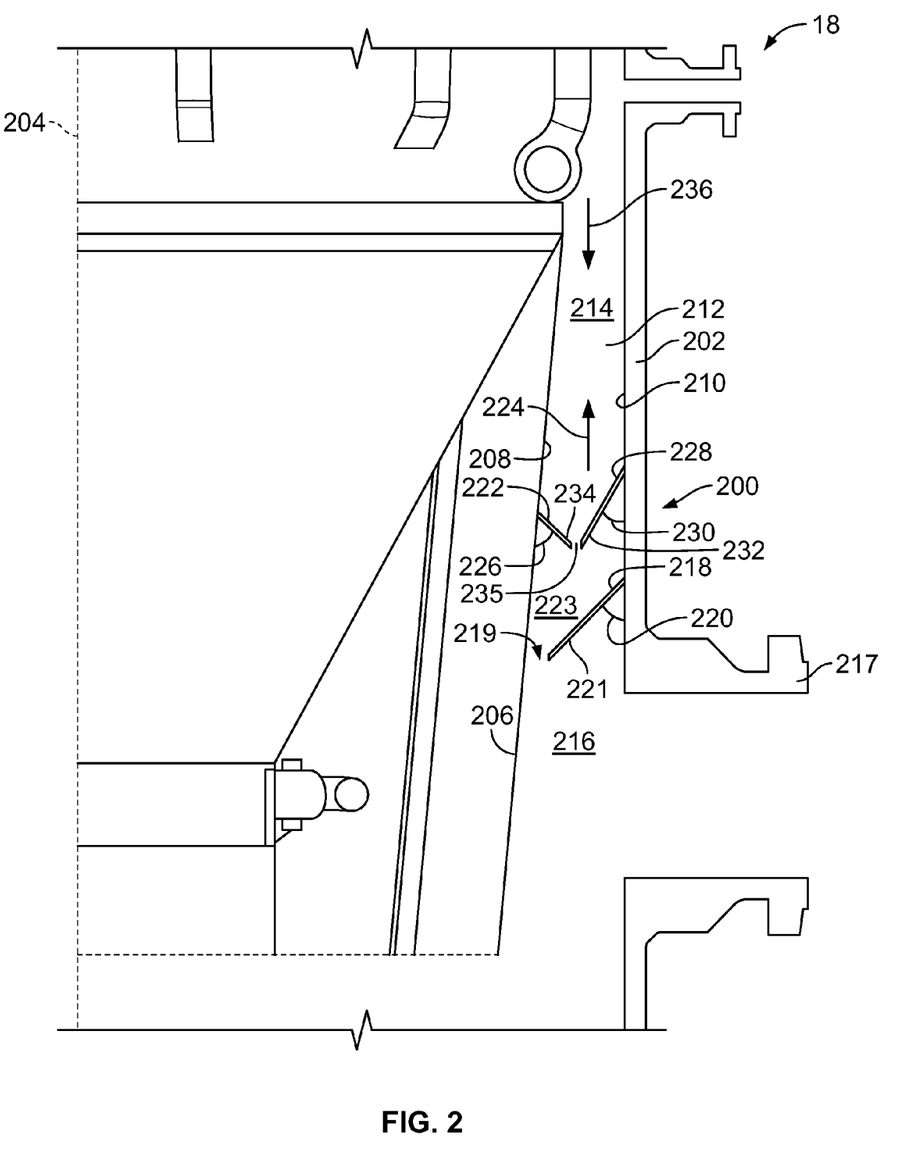
FIG. 2 is an elevation view of syngas cooler that includes an annular seal assembly in accordance with an exemplary embodiment of the present invention.

FIG. 2 is an elevation view of radiant syngas cooler 18 that includes an annular seal assembly 200 in accordance with an exemplary embodiment of the present invention. In the exemplary embodiment, radiant syngas cooler 18 is illustrated as a particular vessel that includes annular seal assembly 200, however annular seal assembly 200 may be used with a variety of other types of vessels in other embodiments of the present invention. In the exemplary embodiment, syngas cooler 18 includes a vessel wall 202 that is substantially cylindrical about a longitudinal axis 204 and a substantially concentric tube cage 206. In other embodiments, tube cage 206 may be a splash cone or other structure within syngas cooler 18 or other vessel. An outer surface 208 of tube cage 206 and an inner surface 210 of vessel wall 202 defines an annulus or annular space 212 therebetween. Annular space 212 is divided into an upper annular space 214 and a lower annular space 216 by seal assembly 200. Radiant syngas cooler 18 includes a syngas transfer nozzle 217 that permits coupling a syngas outlet of radiant syngas cooler 18 to downstream components.

In the exemplary embodiment, seal assembly 200 includes a first baffle element 218 that extends from inner surface 210 into annular space 212 at predetermined angle 220 with respect to inner surface 210. A first gap 219 is formed between a distal end 221 of first baffle element 218 and outer surface 208. In an alternative embodiment, angle 220 is measured with respect to longitudinal axis 204. Seal assembly 200 includes a second baffle element 222 that extends from outer surface 208 above first baffle element 218 in a direction 224 of gravity flow. Second baffle element 222 extends at a predetermined angle 226 with respect to outer surface 208. In an alternative embodiment, angle 226 is measured with respect to longitudinal axis 204. Seal assembly 200 also includes a third baffle element 228 that extends from inner surface 210 above first baffle element 218 in direction 224. Third baffle element 228 extends at a predetermined angle 230 with respect to inner surface 210. In an alternative embodiment, angle 230 is measured with respect to longitudinal axis 204. A distal end 232 of third baffle element 228 is positioned proximate a distal end 234 of second baffle element 222 such that a second gap 235 is formed therebetween.

In the exemplary embodiment, first baffle element 218, second baffle element 222, and third baffle element 228 comprise a plurality of segments (not shown in FIG. 2) spaced circumferentially about annular space 212. A flow of purge fluid 236 is maintained through the seal assembly 200 to help prevent the syngas from flowing into the upper annular space 214.

Figure 3:
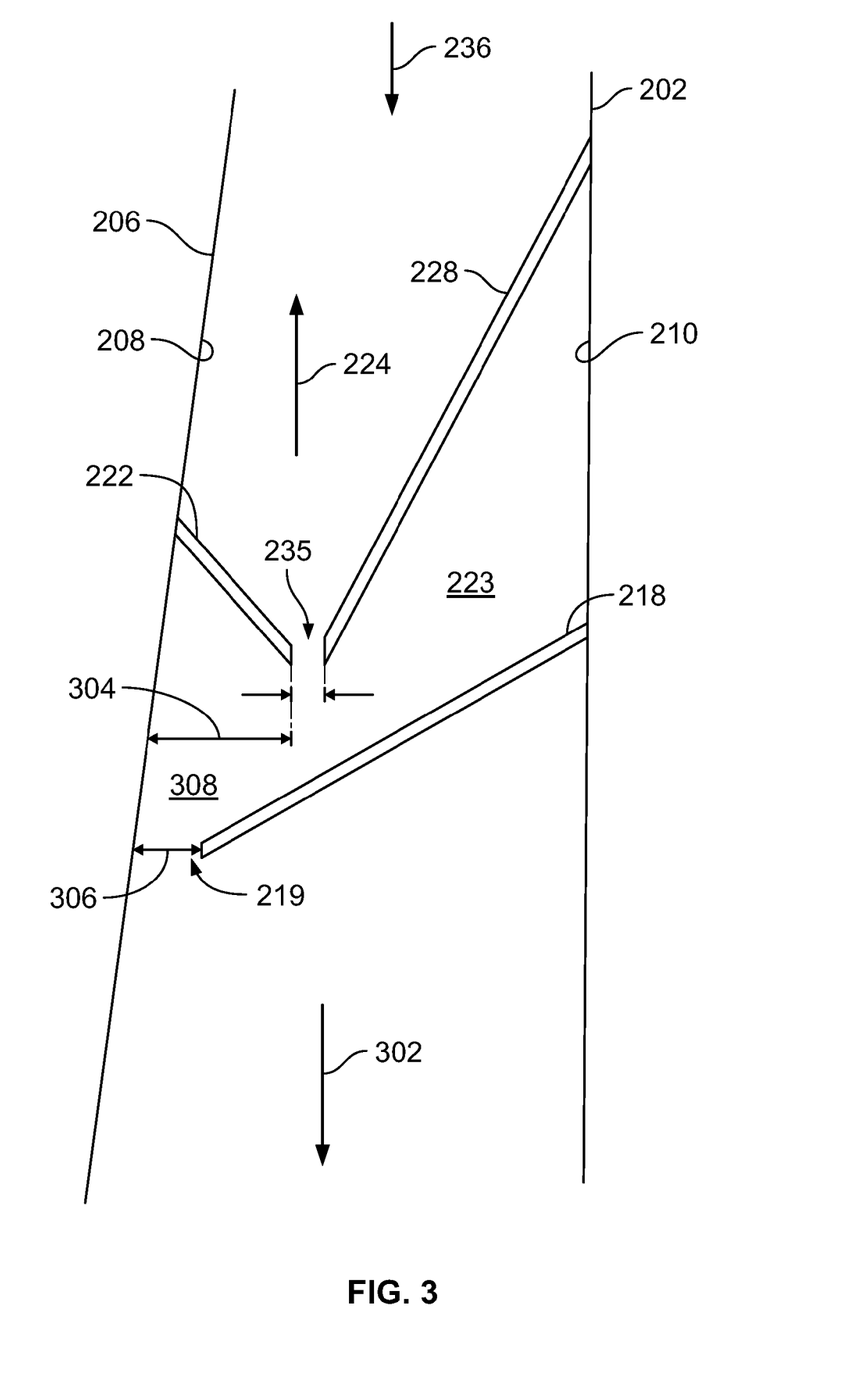
FIG. 3 is an expanded elevation view of seal assembly shown in FIG. 2 in accordance with an exemplary embodiment of the present invention.

FIG. 3 is an expanded elevation view of seal assembly 200 (shown in FIG. 2) in accordance with an exemplary embodiment of the present invention. The sealing characteristics of seal assembly 200 are dependent on a specific relative position of the baffle elements with respect to each other and the size and position of first gap 219 and second gap 235. In the exemplary embodiment, first baffle element 218 is attached to inner surface 210 and is oriented downward in a direction 302 of gravity flow to facilitate draining water that may splash onto first baffle element 218 or that may flow upstream (direction 224) from first baffle element 218. First baffle element 218 extends across annular space 212 forming a small opening, gap 219, between distal end 221 and outer surface 208. During an upset condition when a flow of syngas and/or water is intermittently driven up from lower annular space 216, most of the syngas and/or water flow is blocked and redirected downwards. Gap 219 acts as discharge area for the flow of purge fluid 236, for example, nitrogen, flowing down from upper annular space 214, and permits differential thermal expansion between inner surface 210 and outer surface 208 during operation. Splashes of water and/or syngas that are aligned with gap 219 may pass through gap 219 into a seal volume 223. The water and/or syngas stream escaping lower annular space 216 through gap 219 is blocked by second baffle element 222, which extends into annular space 212 a distance 304 greater than a width 306 of gap 219 such that no direct path exists for the stream of syngas and/or water to travel upstream. Distance 304 is sized to be long enough to cover not only width 306, but also account for a jet (not shown in FIG. 3) expanding into a volume 308 between first baffle element 218 and second baffle element 222 as well. Second baffle element 222 also serves as a guide for a relatively high velocity flow that may impinge on it during certain conditions. Second baffle element 222 tends to turn the relatively high velocity flow after impingement and directs it downward toward first baffle element 218.

Figure 4:
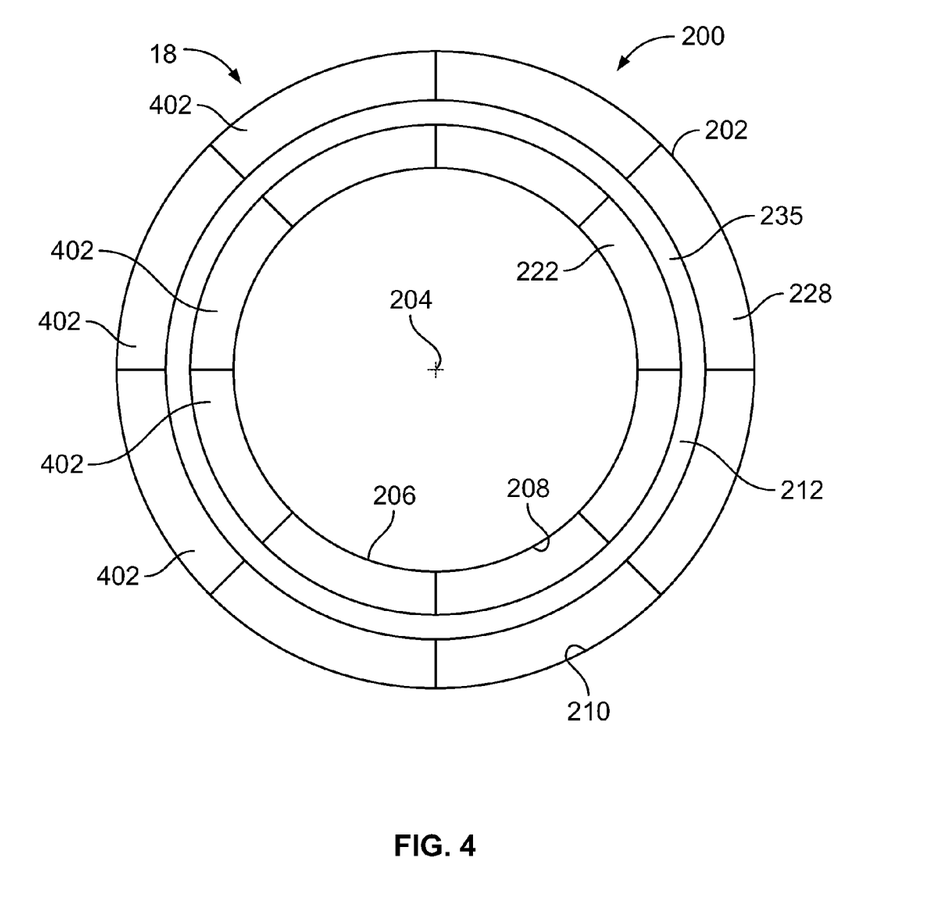
FIG. 4 is a plan view looking down of the seal assembly shown in FIG. 2 in accordance with an exemplary embodiment of the present invention.

FIG. 4 is a plan view looking down on seal assembly 200 (shown in FIG. 2) in accordance with an exemplary embodiment of the present invention. In the exemplary embodiment, syngas cooler 18 includes a vessel wall 202 that is substantially cylindrical about a longitudinal axis 204 and a substantially concentric tube cage 206. An outer surface 208 of tube cage 206 and an inner surface 210 of vessel wall 202 defines an annular space 212 therebetween. In the exemplary embodiment, at least one of first baffle element 218, second baffle element 222, and third baffle element 228 comprises a plurality of segments 402 spaced circumferentially about annular space 212.

FIGS. 5A-E are elevation views of seal assembly 200 (shown in FIG. 2) in accordance with an exemplary embodiment of the present invention. During operation, four upset scenarios are considered for the sizing and positioning of elements 218, 222, and 228 and gaps 219 and 235. A first scenario (shown in FIG. 5A) contemplates a water and/or syngas flow that is weak impinging on first baffle element 218. A first flow path 502 illustrates that the flow will be turned towards first baffle element 218 which will further help guide the flow downwards. Purge flow 504 tends to dilute the syngas and add to the momentum of the downward moving flow, which exits seal volume 223 through gap 219.

Figure 5A:
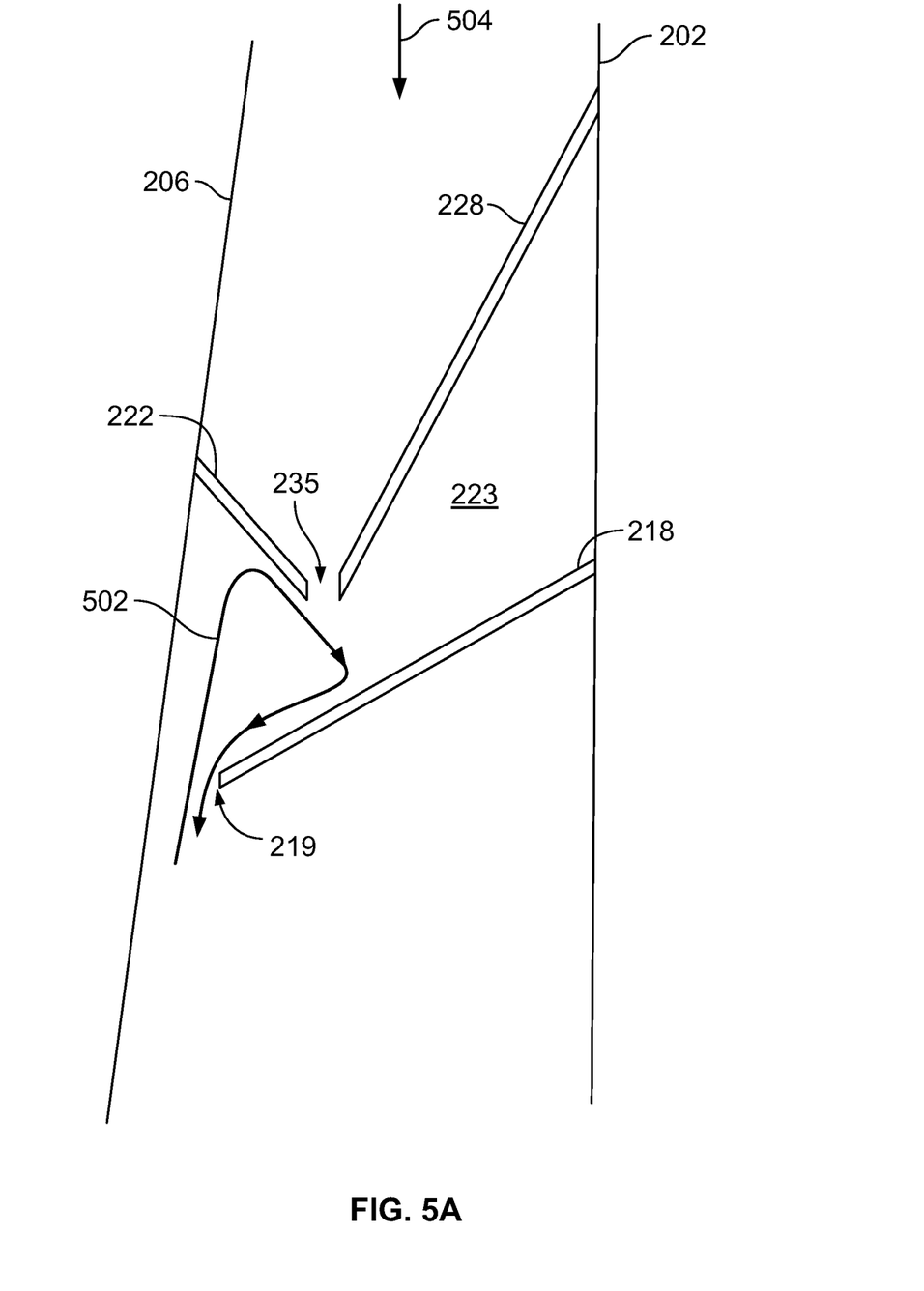
FIGS. 5A-E are elevation views of the seal assembly shown in FIG. 2 in accordance with an exemplary embodiment of the present invention.
Figure 5B:
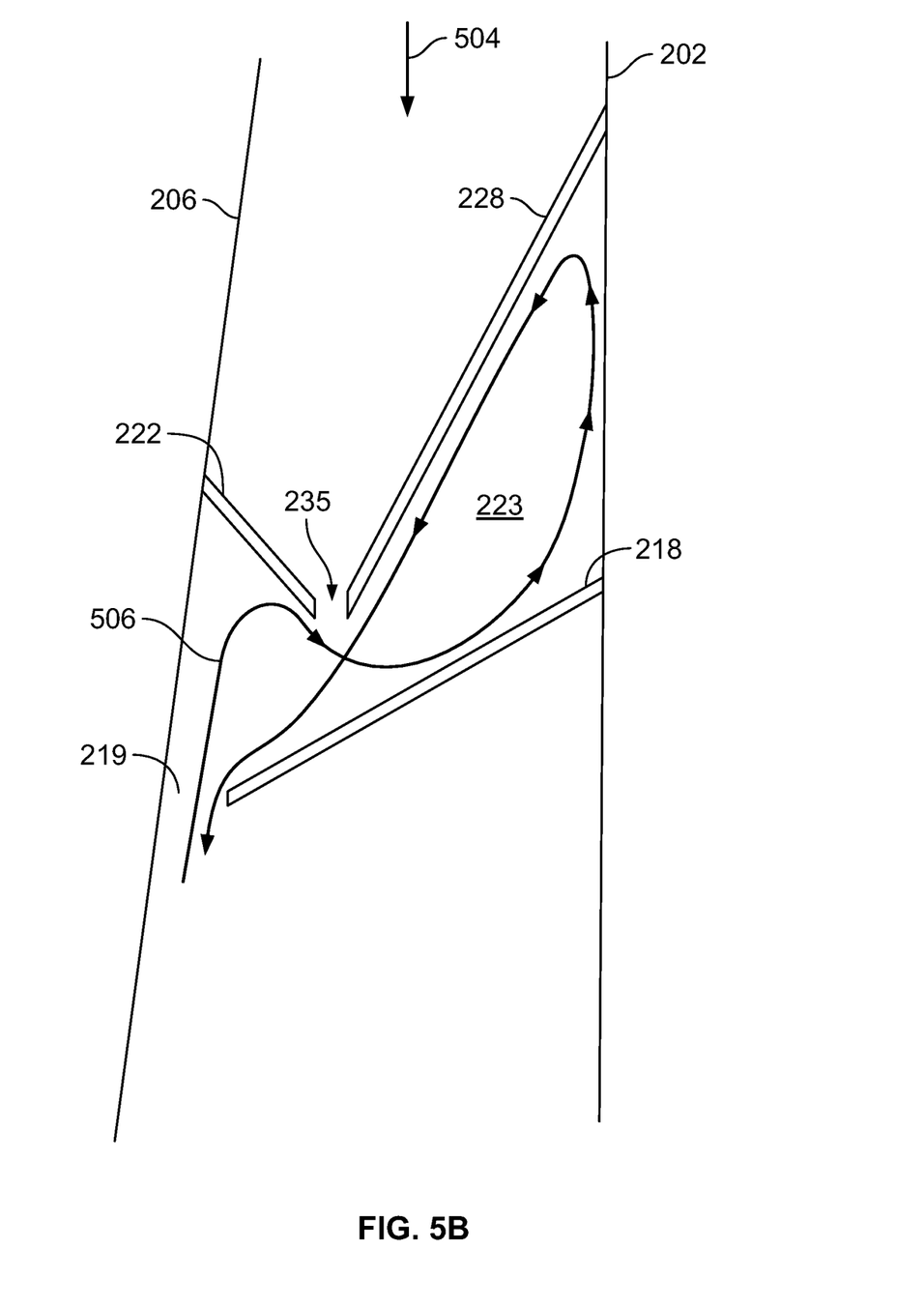

FIG. 5B illustrates a syngas and/or water flow in a second scenario, where the syngas and/or water flow impinging on second baffle element 222 that is very strong. A stream 506 impinging on second baffle element 222 develops in a strong wall jet and is guided upwards along first baffle element 218. Third baffle element 228 is used to block this flow and redirects the flow downwards towards gap 219, where the flow exits seal volume 223.

In the exemplary embodiment, third baffle element 228 is installed on the vessel at a shallower angle than first baffle element 218 and its distal edge is approximately aligned with a distal end of second baffle element 222 to create a controlled opening (gap 235). As shown in FIG. 5B, the relative position of first baffle element 218 and third baffle element 228 creates a volume in which the high velocity syngas and/or water stream can freely expand before being blocked and turned downwards by third baffle element 228. If the syngas and/or water stream lost its entire momentum, it no longer can compete with the purge flow and annular space 212 is effectively purged. If the syngas flow maintains enough momentum it will attach to third baffle element 228, and will impart an ejection effect on purge flow 504, which again will prevent syngas from exiting seal assembly 200.

Figure 5C:
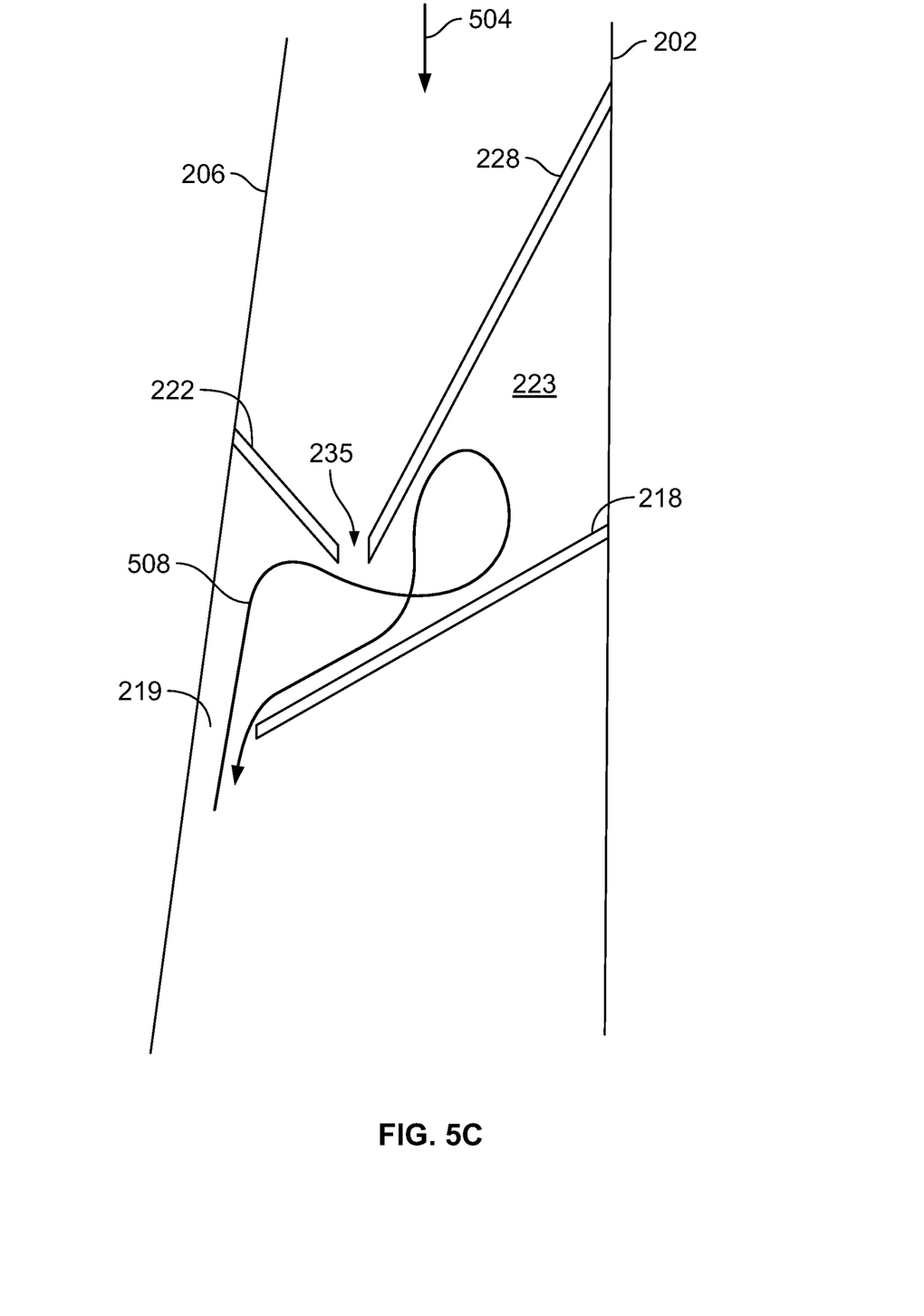

FIG. 5C illustrates a syngas and/or water flow in a third scenario, where the syngas and/or water flow impinging on second baffle element 222 that is not as strong as described in relation to FIG. 5B above. In this scenario, flow development follows path line 508 and is contained within seal volume 223.

Figure 5D:
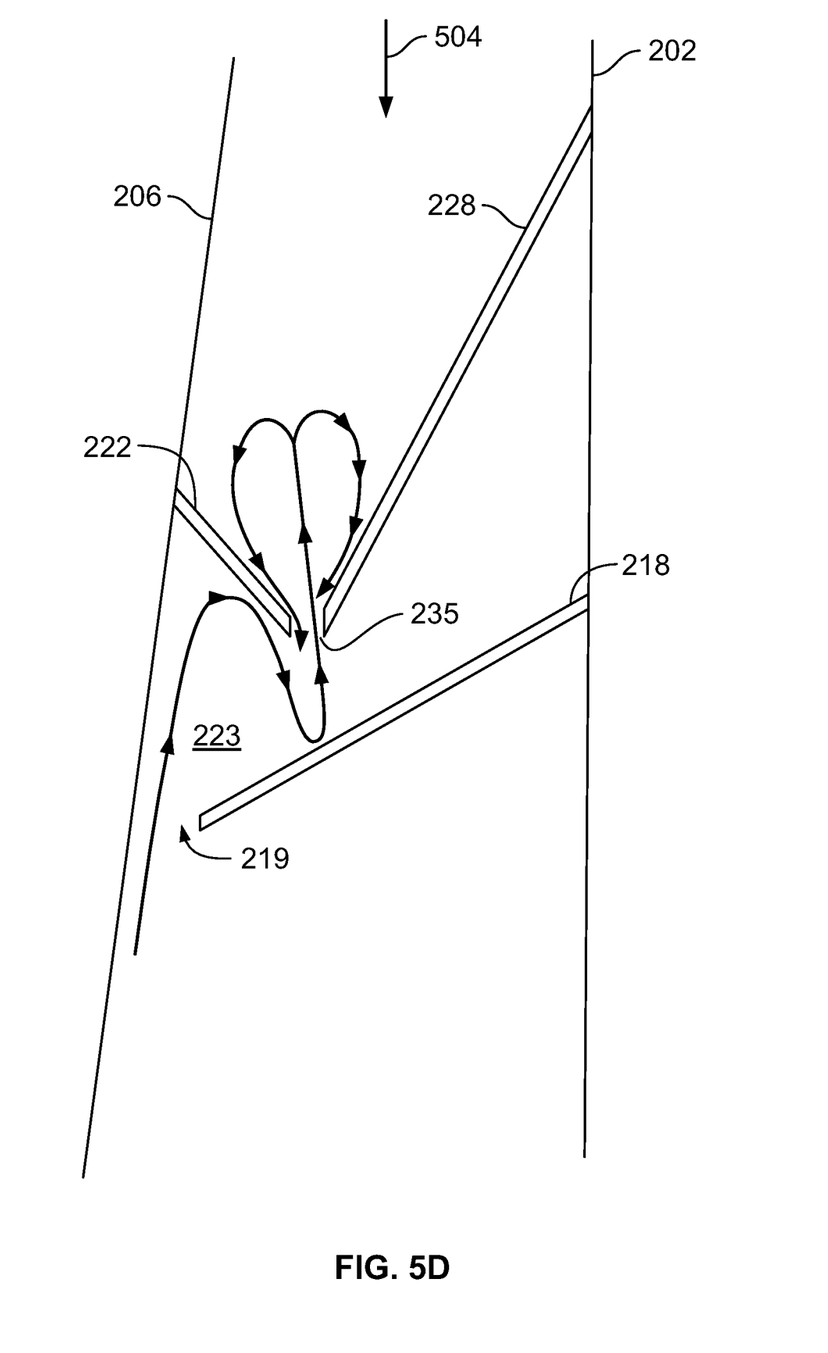
Figure 5E:
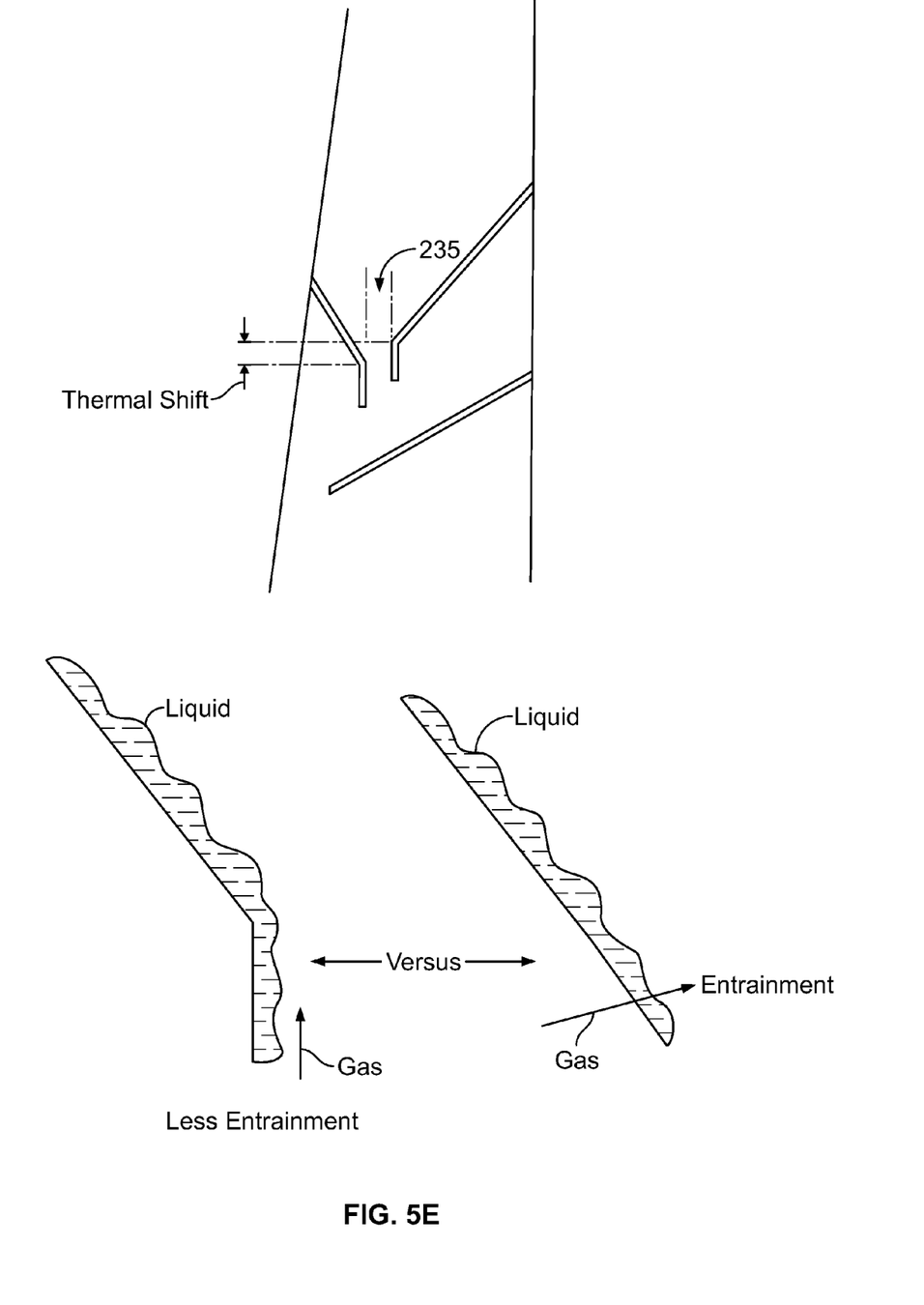

FIG. 5D illustrates a syngas and/or water flow in a fourth scenario, where syngas and/or water flow impinging on first baffle element 218 is turned upwards approximately aligned with gap 235. From the discussion above, this syngas and/or water flow will have a low momentum and will be opposed by purge flow 504 to move upstream of gap 235. If some of the syngas and/or water flow passes up through gap 235, it will be quickly diluted with purge flow 504. At the same time the flow moving up will be confined by gradually diverging walls of second baffle element 222 and third baffle element 228, which effectively diffuses the syngas and/or water flow, decreasing the flow velocity and reducing the tendency for upward moving flow.

FIGS. 5A-D illustrate the main functions of the seal assembly 200 under various operating scenarios. The sealing effectiveness of the seal 200 depends on the features described above and specifically on the gap between baffle elements 222 and 228. The temperature change during the operating will produce variable thermal expansion. In order to maintain a constant gap between the baffle elements 222 and 228 in operation, a drip edge is added to the baffle elements 222 and 228. This important design feature is exemplified in FIG. 5E. Also, the drip edges help to prevent entrainment of liquid. This is done by providing a surface for the liquid to run down cohesively. The drip edge shown in FIG. 5E can be extended upward, downward or in both directions. In addition, the drip edges can include drain holes as needed.

Embodiments of the present invention uses a specific arrangement of baffle type elements to control the flow patterns of syngas and purge fluid to prevent syngas from traveling upstream of the seal. Compared to known seal designs, this design requires a relatively very low pressure drop that facilitates preventing flow entrainment.

The above-described embodiments of a method and systems of controlling the flow patterns of syngas and purge fluid to prevent syngas from traveling upstream in an annulus provides a cost-effective and reliable means for minimizing the amount of purge fluid used for annulus purge. More specifically, the methods and systems described herein facilitate lowering the operation cost for the plant and reduces the amount of purge fluid content in the syngas delivered to the downstream components. In addition, the above-described methods and systems facilitate minimizing the risk of corrosion of the vessel wall and vessel components by preventing syngas and water from traveling upstream in the annulus space. As a result, the methods and systems described herein facilitate minimizing flow upstream of the seal using a very low pressure drop, to prevent flow entrainment in a cost-effective and reliable manner.

An exemplary method and systems for controlling the flow patterns of syngas and purge fluid to prevent syngas from traveling upstream in an annulus are described above in detail. The apparatus illustrated is not limited to the specific embodiments described herein, but rather, components of each may be utilized independently and separately from other components described herein. Each system component can also be used in combination with other system components.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. In particular, more or less than three baffle elements could be used to form a seal assembly. Such other examples are intended to be within the scope of the claims if they have structural elements that do not differ from the literal language of the claims, or if they include equivalent structural elements with insubstantial differences from the literal languages of the claims.

The invention claimed is:

1. A purged seal system for an annular space that includes an inner surface of a radially outer vessel, an outer surface of a radially inner vessel, and a seal passage therebetween, the annular space is divided into an upper annular space and a lower annular space by said purged seal, said system comprising:
    a first baffle element that extends from the inner surface into the seal passage at a first oblique angle with respect to the inner surface;
    a second baffle element that extends from the outer surface above the first baffle element in a direction opposite gravity flow into the seal passage, said second baffle element extends at a second oblique angle with respect to the outer surface, wherein at least a portion of each of said first and second baffle elements overlap within said seal passage; and
    a third baffle element that extends from the inner surface above the first baffle element in a direction opposite gravity flow into the seal passage, said third baffle element extends at a third oblique angle with respect to the inner surface, wherein said third oblique angle is shallower than said first oblique angle, wherein said second baffle element and said third baffle element terminate at approximately the same height within said seal passage such that a distal end of said third baffle element is positioned proximate a distal end of said second baffle element.

2. A system in accordance with claim 1, wherein at least one of said first baffle element, said second baffle element, and said third baffle element comprises a plurality of segments spaced circumferentially about the annular space.

3. A system in accordance with claim 1, wherein said first element extends toward outer surface such that a first gap is formed between a distal end of said first baffle element and the outer surface.

4. A system in accordance with claim 1, wherein said first element extends downward in a direction of gravity flow.

5. A system in accordance with claim 1, further comprising a flow of purge fluid into the upper annular space.

6. A system in accordance with claim 1, wherein said second baffle element extends into the seal passage a distance greater than a first gap between a distal end of said first baffle element and the outer surface.

7. A system in accordance with claim 1, wherein said second baffle element extends into the seal passage a distance greater than a jet expanding into the seal passage through a first gap between a distal end of said first baffle element and the outer surface.

8. A system in accordance with claim 1, wherein a distal end of said second baffle element and a distal end of said third baffle element forms a second gap.

9. A system in accordance with claim 1, wherein said second baffle element and said third baffle element are convergent towards each other in a direction of gravity flow.

10. A system in accordance with claim 1, wherein said first element extends toward outer surface such that a first gap is formed between a distal end of said first baffle element and the outer surface and wherein a distal end of said second baffle element and a distal end of said third baffle element forms a second gap, said second gap offset radially from said first gap.

* * * * *